US00RE41994E

(19) United States
(12) Reissued Patent
Mensen

(10) Patent Number: US RE41,994 E
(45) Date of Reissued Patent: Dec. 14, 2010

(54) WEB MEMBER FOR CONCRETE FORM WALLS

(75) Inventor: Jan Hendrik Mensen, Barcelona (ES)

(73) Assignee: ARXX Building Products, Inc., Cobourg, Ontario

(21) Appl. No.: 09/374,598

(22) Filed: Aug. 13, 1999

Related U.S. Patent Documents

Reissue of:
(64) Patent No.: 5,657,600
Issued: Aug. 19, 1997
Appl. No.: 08/262,505
Filed: Jun. 20, 1994

(51) Int. Cl.
*E04B 2/00* (2006.01)

(52) U.S. Cl. ..... 52/426; 52/309.12
(58) Field of Classification Search ..... 52/426, 52/309.12, 309.11, 564, 562, 592.1, 606, 52/609; 446/85, 102, 107
See application file for complete search history.

(56) References Cited

U.S. PATENT DOCUMENTS

| | | | | | |
|---|---|---|---|---|---|
| 546,758 | A | * | 9/1895 | Bryant | 52/426 |
| 718,429 | A | * | 1/1903 | Conway | 52/314 |
| 1,071,467 | A | * | 8/1913 | Savage | 52/426 |
| 2,851,875 | A | * | 9/1958 | Astorga | 52/426 |
| 2,911,818 | A | * | 11/1959 | Smith | 52/606 |
| 3,147,531 | A | * | 9/1964 | Lyons | 249/14 |
| 3,286,428 | A | * | 11/1966 | Kay | 52/496 |
| 3,612,470 | A | * | 10/1971 | Car et al. | 52/73 |
| 4,306,393 | A | * | 12/1981 | Shelton | 52/169.7 |
| 4,698,947 | A | * | 10/1987 | McKay | 52/309.12 |
| 4,730,422 | A | * | 3/1988 | Young | 52/105 |
| 4,765,109 | A | * | 8/1988 | Boeshart | 52/426 |
| 4,866,891 | A | * | 9/1989 | Young | 52/426 X |

(Continued)

FOREIGN PATENT DOCUMENTS

| | | | |
|---|---|---|---|
| CA | 826584 | * | 11/1969 |
| CA | 1145584 | * | 5/1983 |
| CA | 1182304 | * | 2/1985 |
| CA | 1194706 | * | 10/1985 |
| CA | 1209364 | * | 8/1986 |
| CA | 1233042 | * | 2/1988 |
| CA | 1234701 | * | 4/1988 |
| CA | 1244668 | * | 11/1988 |
| CA | 1303377 | * | 6/1992 |
| CA | 1304952 | * | 7/1992 |
| FR | 1384868 | * | 11/1964 |

OTHER PUBLICATIONS

Brochure "The Ice Block" WAM Inc 206 Main, Maquoketa, Iowa 52060.*

Brochure "Consulwal"; Consulwal, 2668 Mt Albert Rd E, RR #1, Queensville, Ont Can L0G 1RO.*

*Primary Examiner*—Hanh V Tran
(74) *Attorney, Agent, or Firm*—Townsend and Townsend and Crew, LLP

(57) ABSTRACT

The invention provides a building component comprising first and second high density foam panels each having inner and outer surfaces, top and bottom, and first and second ends, the panels arranged in spaced parallel relationship with their inner surfaces facing each other, and at least two bridging members extending between and through and molded into the panel members. Each bridging member comprises a pair of elongated end plates oriented vertically and abutting against the outer surfaces of the panels; a thin narrow strip member joining the mid-areas of the end plates; a series of first narrow bracing members extending from positions adjacent a mid-point of the narrow strip member to positions spaced a short distance from the ends of the end plates; and a series of second narrow bracing members extending from positions on the first bracing members to positions on the strip member intermediate the plates and the mid-point of the strip member.

36 Claims, 10 Drawing Sheets

U.S. PATENT DOCUMENTS 4,879,855 A * 11/1989 Berrenberg ..... 52/309.11
4,884,382 A * 12/1989 Horobin ..... 52/426
4,889,310 A * 12/1989 Boeshart ..... 52/426 X
4,894,969 A * 1/1990 Horobin ..... 52/426 X
4,936,540 A * 6/1990 Boeshart ..... 52/426 X
4,938,449 A * 7/1990 Boeshart ..... 52/426 X
5,003,746 A * 4/1991 Wilston ..... 52/592.1
5,107,648 A * 4/1992 Roby ..... 52/426 X
5,154,032 A * 10/1992 Ritter ..... 52/592.1
5,390,459 A * 2/1995 Mensen ..... 52/426

* cited by examiner

WEB MEMBER FOR CONCRETE FORM WALLS

Matter enclosed in heavy brackets [ ] appears in the original patent but forms no part of this reissue specification; matter printed in italics indicates the additions made by reissue.

This application relates to a building component of the type which is used to build up permanent concrete form walls in building construction.

BACKGROUND OF THE INVENTION

In conventional construction in North America concrete walls are normally produced by constructing form walls, pouring concrete into the space between the form walls and, upon the setting of the concrete, removing the form walls. Finishing materials are then added to the concrete walls as required.

Typically in residential construction, concrete basement and other concrete walls will be constructed in the manner discussed above and wood framing will be constructed as required on top of or beside the walls. Insulation will be inserted between the framing members and the wall finished inside and out as desired.

Clearly both parts of this construction are inefficient. It is time-consuming and wasteful of materials to have to remove the form walls after the concrete walls are poured. Furthermore, it is now common to insulate all walls, including basement walls, particularly in colder climates, and framing and insulation must be installed separately inside the walls.

The piecemeal construction which is inherent in the wood frame part of the structure is labour-intensive and expensive.

As a result, there have been ongoing efforts for many, many years to provide more modular types of wall construction from which efficiencies can be gained.

One such construction type is that with which the current invention is concerned.

For some 15 years a system has been in use particularly in Europe which combines a number of the operations normally associated with residential and other building construction to provide savings in materials, energy, etc. The system basically comprises the use of a foam insulating material to construct permanent form walls. The form walls are constructed and the concrete poured and the form walls then left in place. The concrete walls so formed need not be confined to basement walls but may comprise all of a building's walls. No further insulation is necessary, and finishing materials may be applied to the interior and exterior of the wall as required.

Variations on this system have been proposed to achieve various improvements. All of the systems thus far proposed, while in many cases very useful, suffer from some or other disadvantages.

Against this background the present invention provides a building component for use in such a system which when integrated into a wall construction offers advantages over prior art such systems.

PRIOR ART

Applicant is aware of Canadian Patent No. 1,209,364, issued in 1986 to Aregger AG Bauunternehmung. The components described in that patent include cross members, the ends of which are disadvantageously completely embedded in the foam blocks.

United States patents of some interest include U.S. Pat No. 4,698,947, issued October 1987 to McKay and pertaining to a block in which the cross members are again imbedded in the foam blocks but in slots provided for the purpose.

U.S. Pat No. 4,730,422, issued March 1988 to Young, comprises form walls which again utilize bridging members the ends of which are located in slots imbedded within foam blocks.

U.S. Pat No. 4,879,855, issued November 1989 to Berrenberg. illustrates a form wall in which the bridging members are constructed from expanded webbed steel having galvanized steel strips at the ends thereof.

U.S. Pat. No. 4,884,382, issued December 1989 to Horobin, again discloses bridging members which fit within preformed slots in foamed block members.

Applicant's own earlier U.S. patent application, Ser. No. 08/041,412, filed 31 Mar. 1993, now U.S. Pat No. 5,390,459 discloses an improved system utilizing plastic bridging members in a form wall.

BRIEF SUMMARY OF THE INVENTION

It has now been discovered that substantial advantages can be obtained where the building component used to build up a concrete form wall comprises bridging members which are engineered to combine an enhanced strengthening and reinforcing grid with a substantial reduction in material. The grid achieves enhanced strength not only from the arrangement of bracing members but also from enlarged openings in the grid allowing improved flow of foam and, subsequently, of concrete.

Thus the invention provides a building component comprising first and second high density foam panels each having inner and outer surfaces, top and bottom, and first and second ends, the panels arranged in spaced parallel relationship with their inner surfaces facing each other, and at least two bridging members extending between and through and molded into the panel members. Each bridging member comprises a pair of elongated end plates oriented vertically and abutting against the outer surfaces of the panels; a thin narrow strip member joining the mid-areas of the end plates; a series of first narrow bracing members extending from positions adjacent a mid-point of the narrow strip member to positions spaced a short distance from the ends of the end plates; and a series of second narrow bracing members extending from positions on the first bracing members to positions on the strip member intermediate the plates and the mid-point of the strip member.

In a further embodiment there is provided, for use in a building component comprising first and second high density foam panels each having inner and outer surfaces, top and bottom, and first and second ends, the panels arranged in spaced parallel relationship with their inner surfaces facing each other, and at least two bridging members extending between and through and molded into the panel members; an improved bridging member comprising a pair of elongated end plates oriented vertically and abutting against the outer surfaces of the panels; a thin narrow strip member joining the mid-areas of the end plates; a series of first narrow bracing members extending from positions adjacent a mid-point of the narrow strip member to positions spaced a short distance from the ends of the end plates; and a series of second narrow bracing members extending from positions on the first bracing members to positions on the strip member intermediate the plates and the mid-point of the strip member.

In a further embodiment there is provided a building component comprising first and second high density foam panels each having inner and outer surfaces, top and bottom, and first and second ends. The panels are arranged in spaced parallel relationship with their inner surfaces facing each other, and at least two bridging members extend between and through and molded into the panel members. The top of one panel is substantially thicker than the bottom thereof, the outer surface of that panel is profiled to extend outwardly and upwardly from the bottom to the top thereof, and the inside surface of the thicker part is partially cut away in areas not containing the bridging members.

In a further embodiment there is provided a building component comprising first and second high density foam panels each having inner and outer surfaces, top and bottom, and first and second ends. The panels are arranged in spaced parallel relationship with their inner surfaces facing each other, and at least two bridging members extend between and through and molded into the panel members. At at least one end of and integral with the first and second panels, an end part protrudes longitudinally from a part of that end of the panels, the end part having mating means for mating with a complementary end part on a second component.

BRIEF DESCRIPTION OF THE DRAWINGS

In drawings which illustrate embodiments of the invention.

Figure 1:
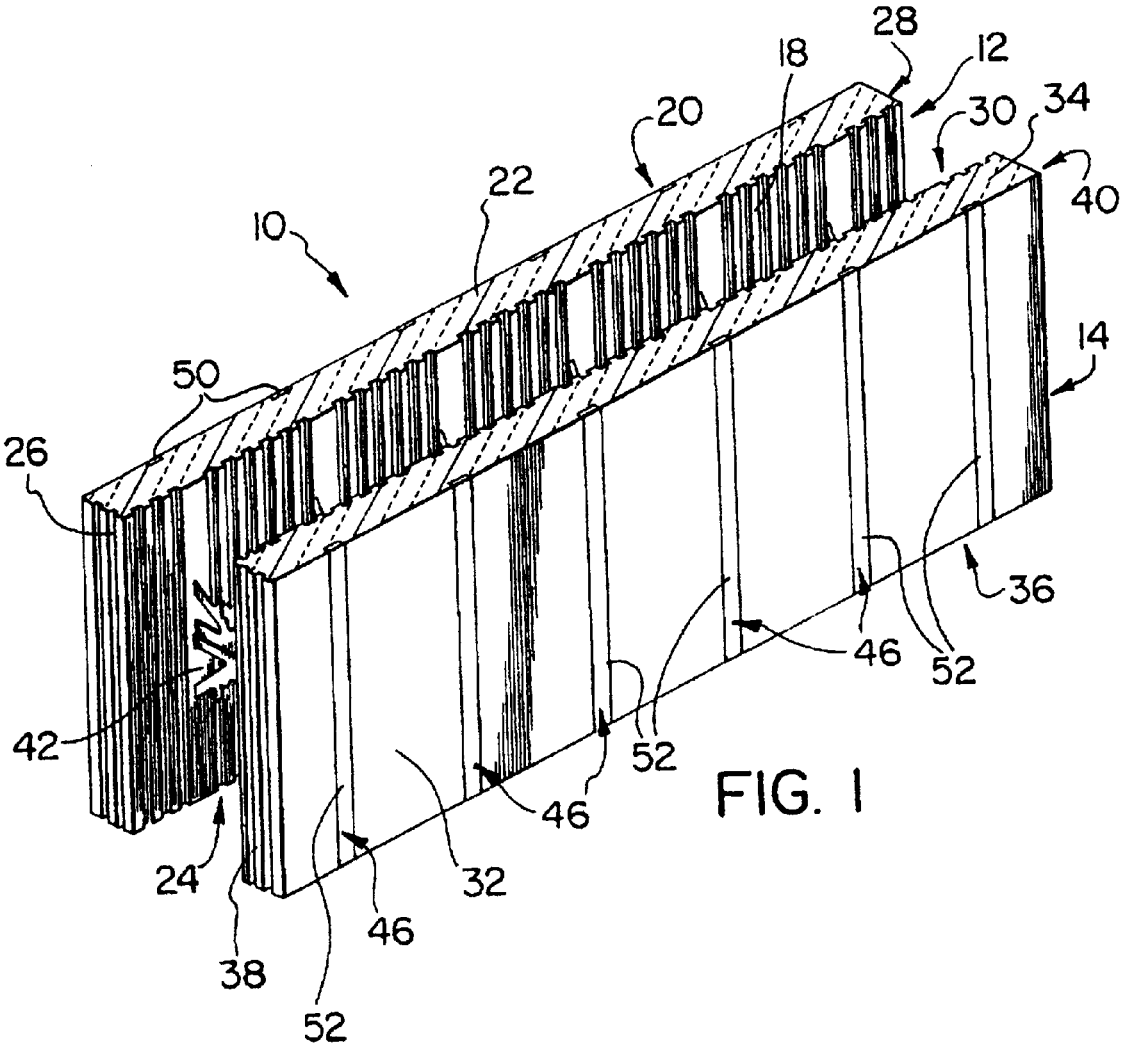
FIG. 1 is a perspective view of a building component according to the invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

The building component 10 comprises first and second foam panels 12 and 14 secured together by at least two bridging members 42.

Panel 12 comprises inner and outer surfaces 18 and 20 respectively, top and bottom 22 and 24 respectively, and first and second ends 26 and 28. Panel 14 comprises inner and outer surfaces 30 and 32, top and bottom 34 and 36, and first and second ends 38 and 40.

The panels 12 and 14 are preferably fire retardant expanded polystyrene, polyethylene or polypropylene. Subject to indentations and protrusions of minor height to be discussed below, the panels are of uniform rectangular cross-section. In a typical case each panel may be 48 inches long, 16¾ inches high and 2⅝ inches thick.

Bridging members 42 comprise a pair of elongated end plates 44 and 46 joined by narrow strip member 48.

As illustrated, for example, in FIG. 1, the end plates 44 and 46 have their outer surfaces 50 and 52 respectively substantially flush with the outer surfaces 20 and 32 of panels 12 and 14 respectively. End plates 44 and 46 are oriented vertically relative to panels 12 and 14. Throughout this specification references to vertical and horizontal are intended to indicate the orientation of component 10 in position of use in a vertical wall.

Figure 4:
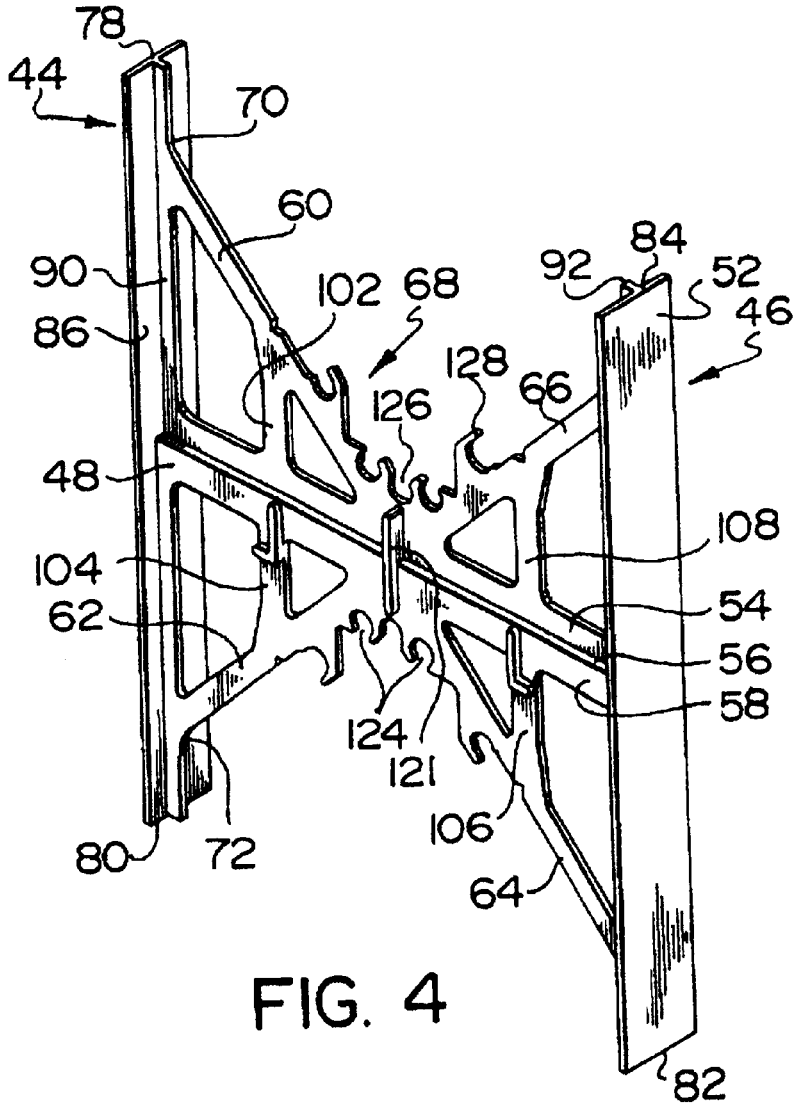
FIG. 4 is a perspective view of a bridging member for use in the invention.
Figure 6:
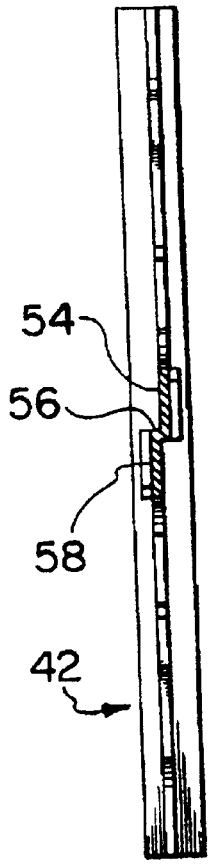
FIG. 6 is an end view of the bridging member of FIG. 4.
Figure 5:
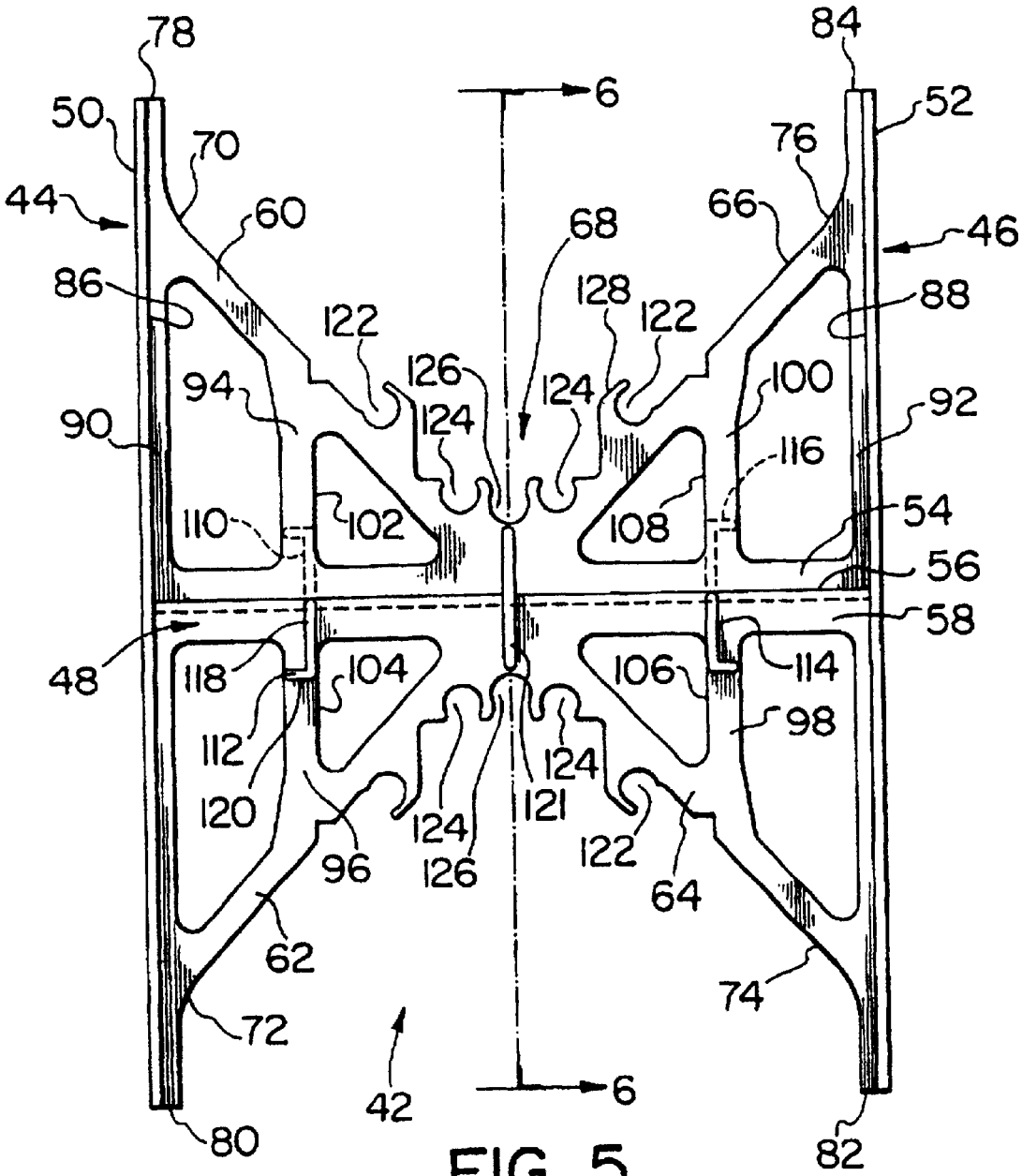
FIG. 5 is a side view of the bridging member of FIG. 4.
Figure 7:
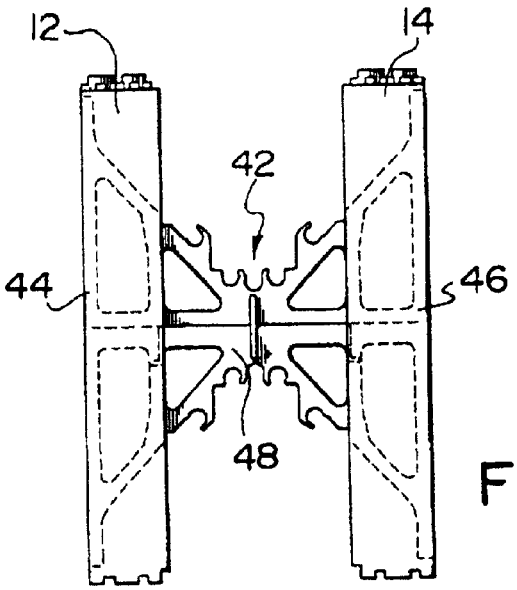
FIG. 7 is an end view of a building component according to the invention incorporating the bridging member of FIG. 4.

In the preferred configuration of bridging members 42, as illustrated in FIGS. 4 to 6, the narrow strip member 48 has a stepped configuration such that a first part 54 is horizontally offset at 56 from a second part 58.

Narrow bracing members 60, 62, 64 and 66 extend between a mid-area 68 of narrow strip member 48 and positions 70, 72, 74 and 76 close to but spaced from the extremities 78, 80, 82 and 84 of end plates 44 and 46. In the preferred embodiment end plates 44 and 46 include on the inner surfaces 86 and 88 thereof elongated reinforcing ribs 90 and 92 which are integral with the respective ends of bracing members 60, 62, 64 and 66.

Bridging member 42 includes second bracing members 94, 96, 98 and 100 between narrow strip member 48 and first bracing members 60, 62, 64 and 66 respectively. In the preferred configuration second bracing members 94, 96, 98 and 100 are substantially vertically oriented and have their inner edges 102, 104, 106 and 108 respectively substantially flush with inner surfaces 18 and 30 respectively of panels 12 and 14.

The first bracing members 60, 62, 64 and 66 form in their preferred configuration an X-shape joining the positions 70, 72, 74 and 76 near the ends of end plates 44 and 46 through the mid-area 68. This configuration provides a substantial increase in strength in the bridging member over known such members.

In the preferred configuration transverse stiffening members 110, 112, 114 and 116 are provided between narrow strip member 48 and second bracing members 94, 96, 98 and 100 respectively. In configuration each of these members includes a first part 118 which in use is substantially flush with the inner surfaces 18 and 30 of panels 12 and 14; and a second section 120 which extends into said panels.

There is also preferably provided a transverse stiffening member 121 across both surfaces of mid-area 68.

Mid-area 68 is preferably enlarged and profiled to provide a series of seats for rebar positioning. Thus, utilizing the seats 122 provides an open pattern of rebar. Use of seats 124 provides a more closed pattern. Seats 126 provide one or two centred rebar rods.

In order to position and stabilize vertical rebar in constructing the wall, horizontal rebar may be placed in alternate seats, as selected, with the vertical rebar then placed between horizontal rebar. For example, horizontal rebar may be placed in seats 124 with vertical rebar in the space between.

Clearly a preferred pattern of rebar installation may be selected to meet job requirements.

In the preferred configuration each of the rebar seats is provided with a resilient hook member as at 128 to provide a snap fit to maintain the rebar in position. This will avoid the extra labour involved in tying in some or all of the rebar.

Each bridging member 42 comprises a single integral unit molded of plastic. The preferred plastic is high-density flame retardant polyethylene, although flame retardant polypropylene, polystyrene and other suitable polymers may be used.

The bridging members 42 are molded into the panels 12 and 14 in the course of producing the panels. As best seen in FIG. 1, the end plates 44 and 46 are preferably of substantially equal height with the panels 12 and 14 and are substantially flush with the top and bottom of the panels, subject to the vertical joining means on the panels, to be discussed below.

Figure 17:
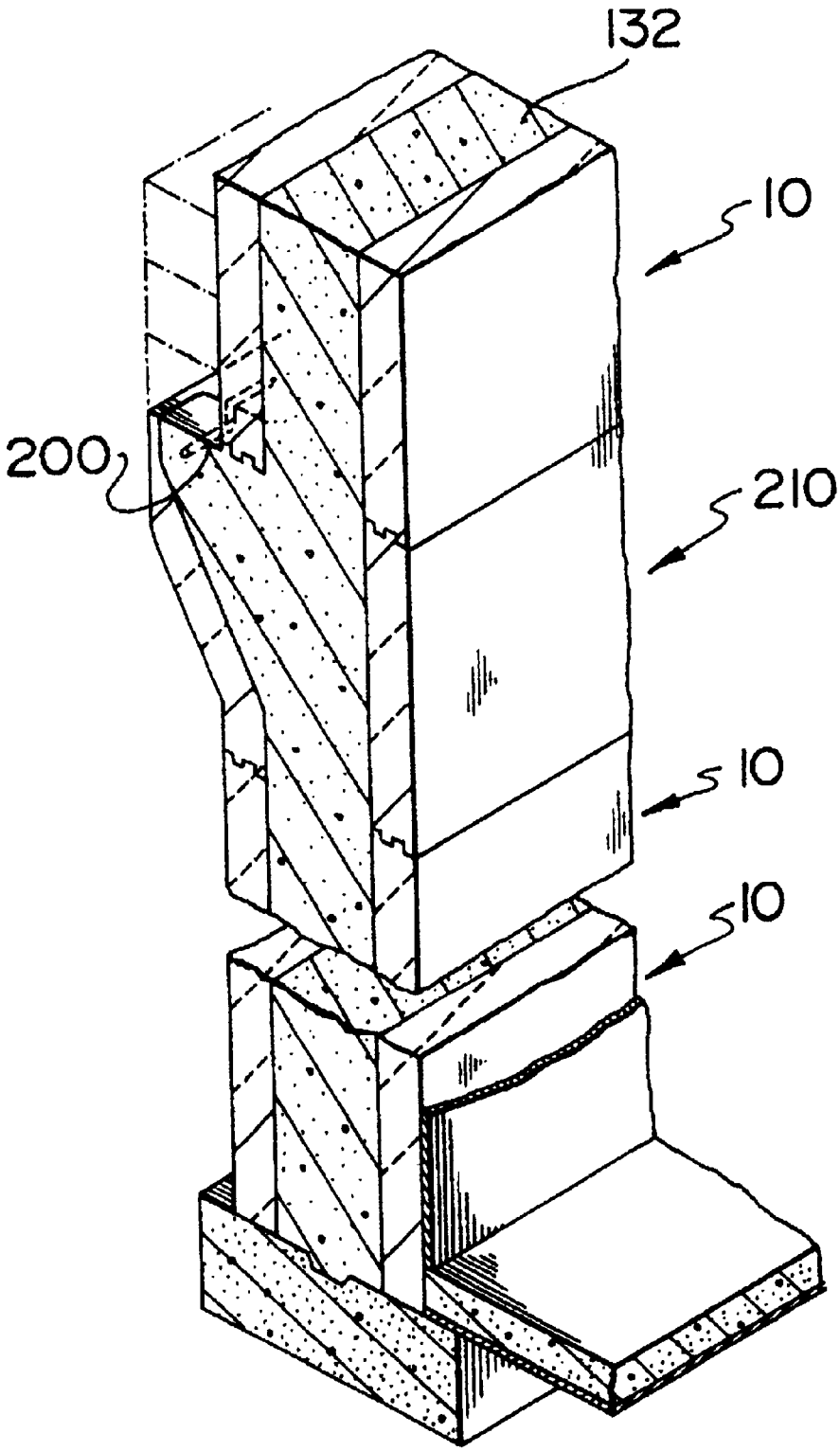
FIG. 17 is a perspective view of a wall section constructed according to the invention.

As illustrated in FIG. 17, a series of components 10, including a row of components 210 (FIGS. 8–10) are built up to form a wall 130. Initially a series of components 10 and 210 are stacked to form a hollow wall or concrete form after which concrete 132 is poured into the hollow part of wall 130 to complete the wall.

Figure 18:
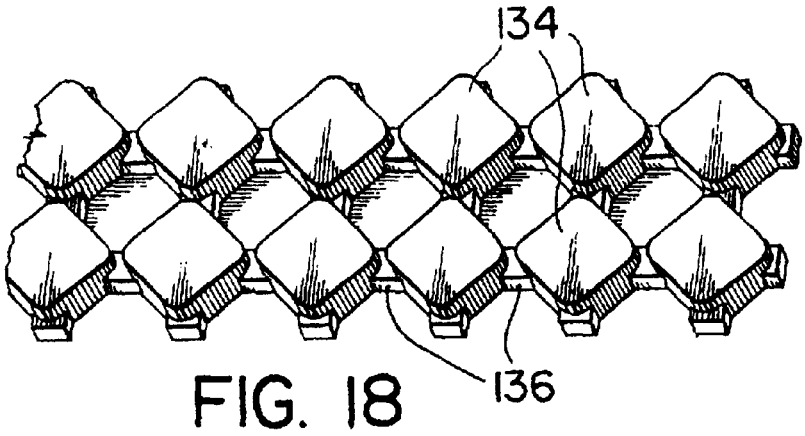
FIG. 18 is a perspective view of a series of protrusions and interconnecting walls for use on the top of a building component according to the invention.
Figure 19:
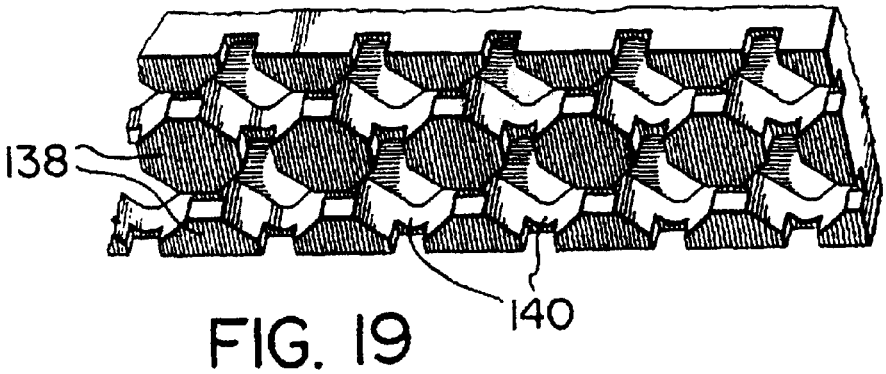
FIG. 19 illustrates a series of protrusions and depressions for use on the bottom of a building component according to the invention.
Figure 20:
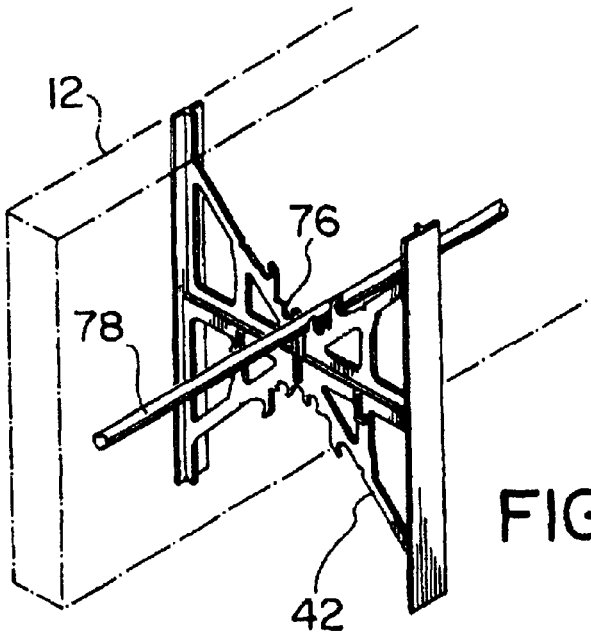
FIG. 20 is a perspective view of a building component according to the invention illustrating the use of rebar.

In order to facilitate the stacking of the components 10, the panels 12 and 14 are provided on the top thereof with a series of plugs 134 joined by low walls 136 (FIG. 18); and on the bottom 24 and 36 thereof with a mating series of plugs 138 and walls 140 (FIG. 19). The plugs 134 and 138 are offset relative to each other, such that when the bottom of one component 10 is placed on the top of a lower component 10, the plugs 134 and walls 136 of the upper component mate with the plugs 138 and walls 140 of the bottom component to form a tight seal to prevent leakage of concrete during wall formation and of energy through the completed wall.

Figure 2:
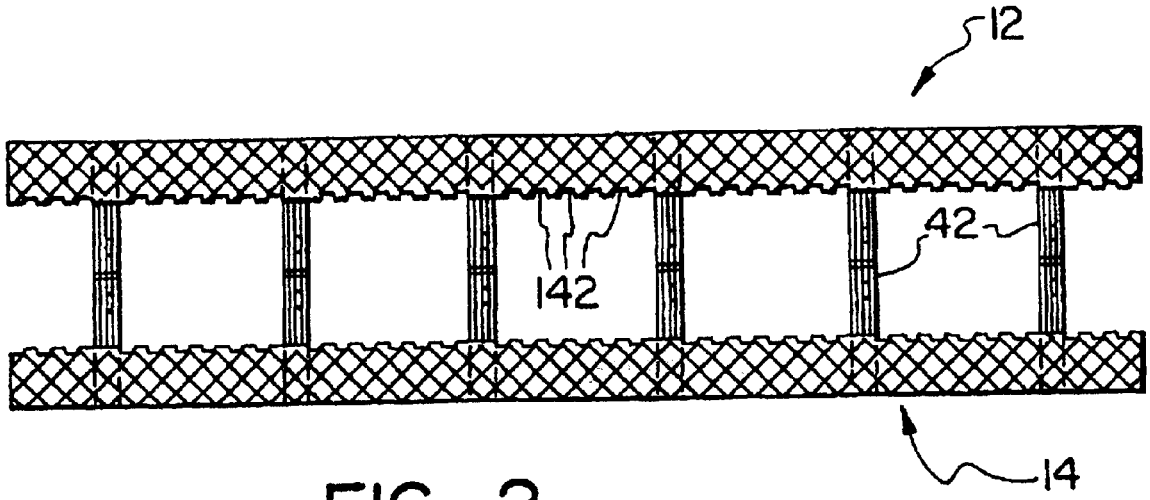
FIG. 2 is a top plan view of a building component according to the invention.
Figure 3:
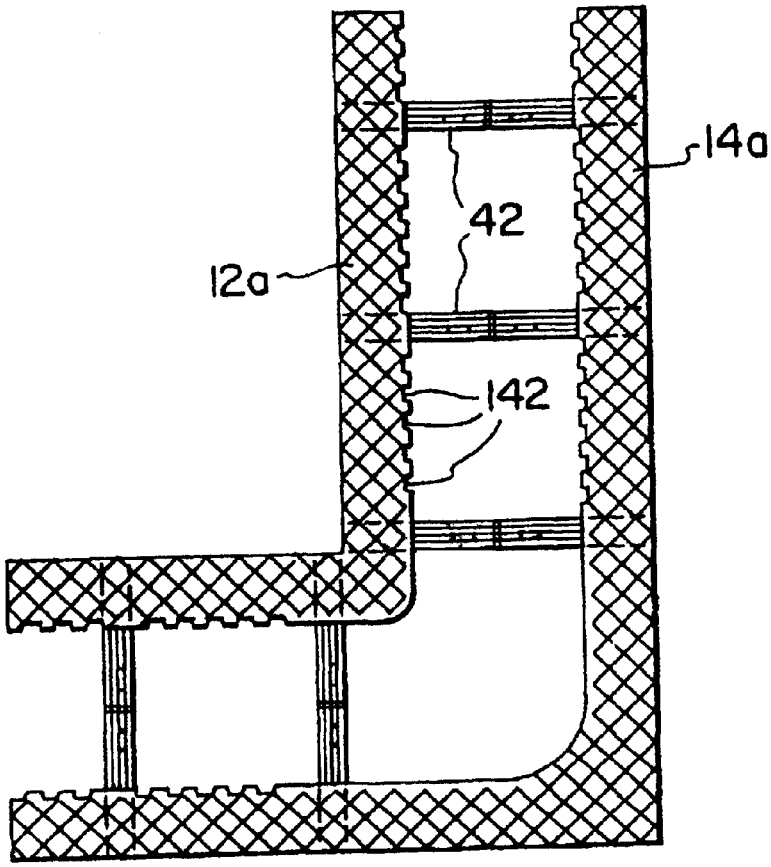
FIG. 3 is top plan view of another embodiment of the building component according to the invention.

As best illustrated in FIGS. 2 and 3, the inner surfaces 18 and 30 of panels 12 and 14 respectively are preferably provided with a series of indentations 142. Concrete being poured into the hollow wall will flow into indentations 142 and enhance the bond between panels 12 and 14 and concrete 132.

Figure 8:
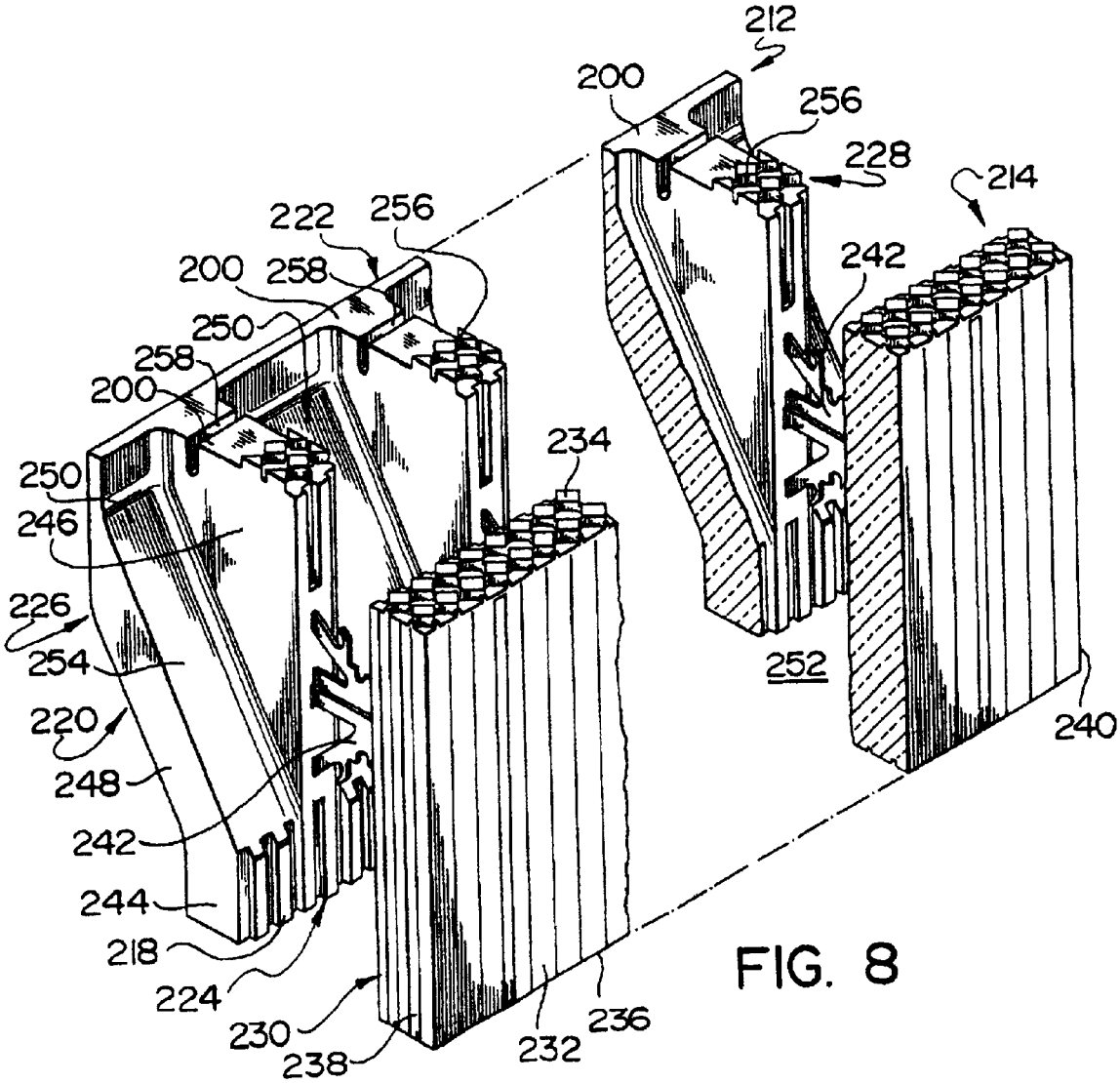
FIG. 8 is a perspective view of an embodiment of the invention illustrating a brick shelf.
Figure 9:
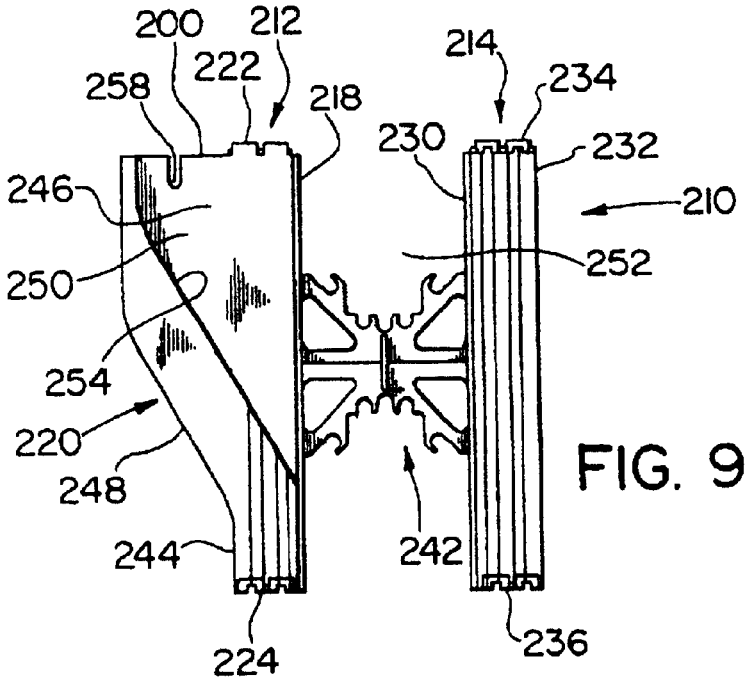
FIG. 9 is an end view of the embodiment of FIG. 8.
Figure 10:
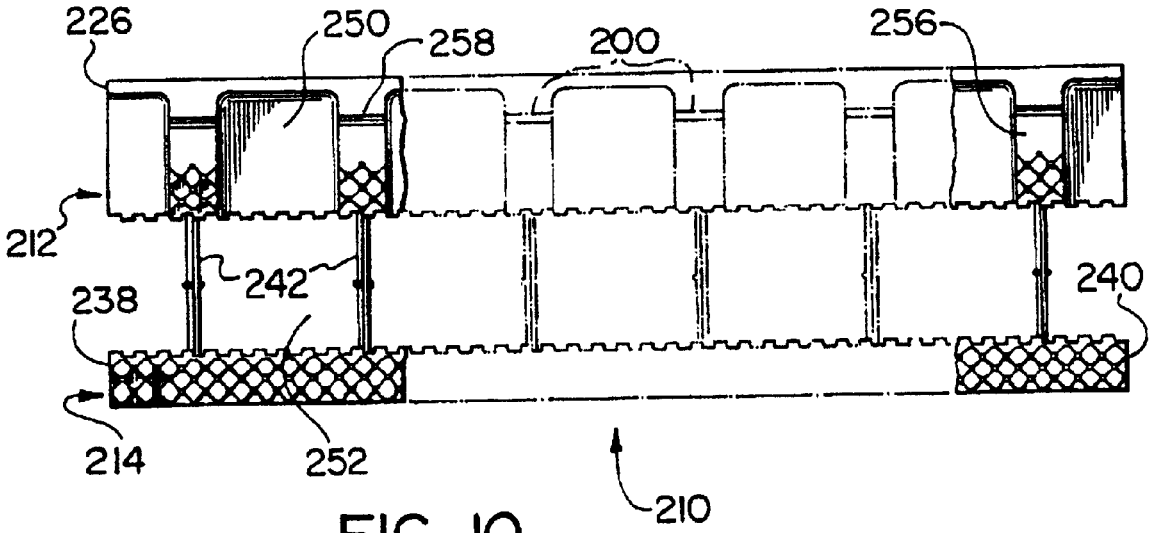
FIG. 10 is a top plan view of the embodiment of FIG. 8.

With reference to FIGS. 8 to 10, an embodiment of the invention is shown which provides for an integral brick shelf 200 to be formed at the appropriate level of the form wall. This will normally be at grade. In current construction considerable cost and labour is expended in providing footings for brick cladding where a brick structure is being constructed. The embodiment of FIGS. 8 to 10 permits an integral brick shelf to be constructed.

Thus, the building component 210 comprises first and second foam panels 212 and 214 secured together by at least two bridging members 242.

Panel 212 comprises inner and outer surfaces 218 and 220 respectively, top and bottom 222 and 224 respectively, and first and second ends 226 and 228. Panel 214 comprises inner and outer surfaces 230 and 232, top and bottom 234 and 236, and first and second ends 238 and 240.

As can be seen in FIGS. 8 to 10, the top 222 of panel 212 is substantially thicker than the bottom 224. The outer surface 220 of panel 212 is profiled to extend outwardly and upwardly from bottom 224 to the top 222. In the preferred configuration bottom part 244 of panel 212 is the same thickness as panel 214 and of other panels in a wall. At part 244 the outer surface 220 is preferably vertical. A top part 246 of panel 212 is substantially thicker than bottom part 244. Outer surface 220 at part 246 is also preferably vertical. At an intermediate part 248 of panel 212 the outer surface 220 is profiled to join lower part 244 to thicker upper part 246.

As illustrated in FIGS. 8 and 9, parts of thicker upper part 246 of panel 212 are cut away (by means of mold cavities rather than by actual cutting) in areas which do not contain bridging members 242. The cut-away areas 250 are thus open to the space 252 between the panels.

The inner surface 218 of panel 212 in the area of cut-aways 250 is profiled as at 254 to follow the profile of outer surface 220, although not necessarily at uniform distance from that outer surface.

It will thus be seen that when a wall is constructed in the usual way which includes a course of modified components 210 (see FIG. 17), and when concrete is poured to form the core of the wall, the concrete will fill the cut-aways or cavities 250 to form the brick shelf integral with the wall.

The solid foam partitions 256 between cut-aways 250 preferably include a slot 258 to support rebar or other reinforcing means for the shelf.

A further problem which arises in the construction of form walls concerns the difficulty in establishing correct angles where a directional change in a wall of less than 90° is required. If, for example, the angle in a foundation wall is incorrect by a small amount the entire building above that part of the foundation is affected. Accordingly, the embodiment of FIGS. 11 to 16 has been devised to enable a range of directional changes or corners to be accurately constructed in a form wall, providing continuity in the form wall.

Thus, the component 310 comprises panels 312 and 314 secured together by a series of bridging members 342. Panel 312 comprises inner and outer surfaces 318 and 320 respectively, and first and second ends 326 and 328. Panel 314 comprises inner and outer surfaces 330 and 332, top and bottom 334 and 336, and first and second ends 338 and 340.

At the end of component 310 integral end parts 344 and 346 are shown. These end parts are seen to be integral with panels 312 and 314 respectively. Each of end parts 344 and 346 is preferably semi-circular in configuration.

Figure 13:
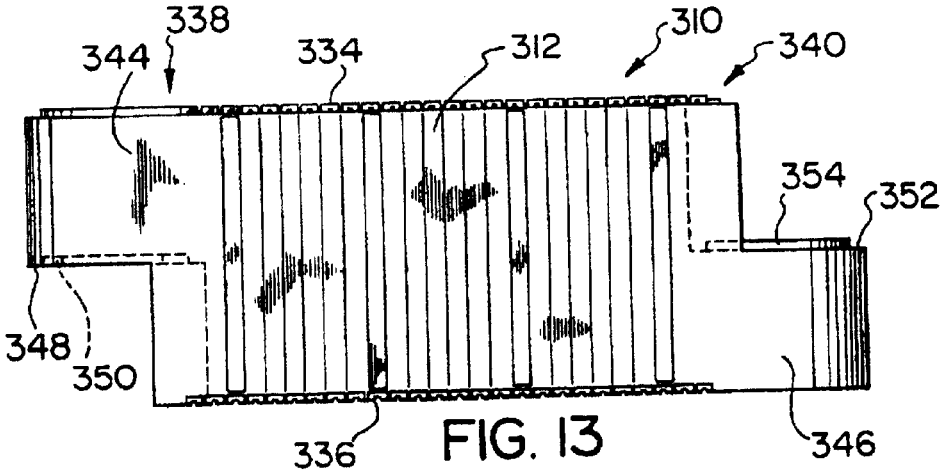
FIG. 13 is a side elevation of a component for use in the embodiment of FIG. 11.
Figure 14:
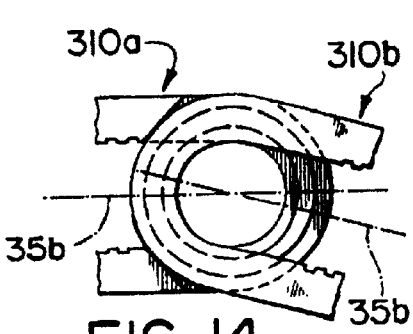
FIGS. 14 to 16 are top plan views of variations of the embodiment of FIG. 11.
Figure 15:
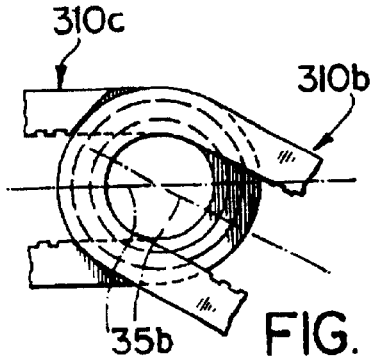
Figure 16:
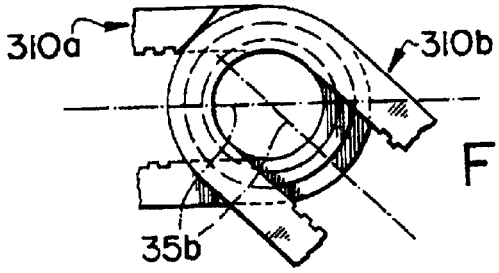

As illustrated in FIG. 13, end part 344 extends from the upper half of ends 326 and 328 of panels 312 and 314; and end part 346 extends from the lower half of ends 328 and 340 of the panels. End part 344 preferably includes in a lower surface 348 thereof a central semi-circular groove 350.

The upper surface 352 of end part 346 includes a complementary central raised tongue 354 of semi-circular plan.

Figure 11:
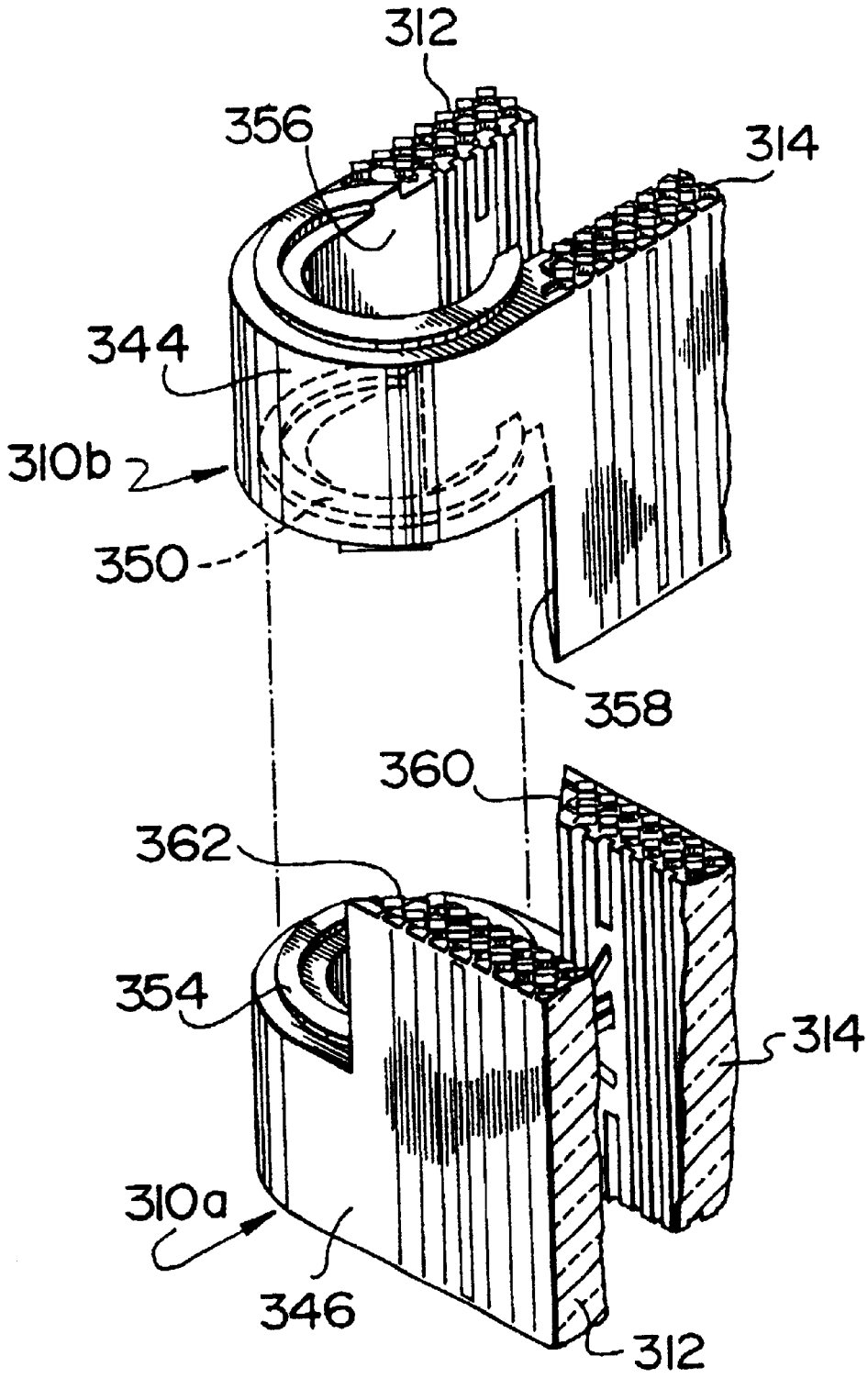
FIG. 11 is an exploded perspective view of a further embodiment of the invention.
Figure 12:
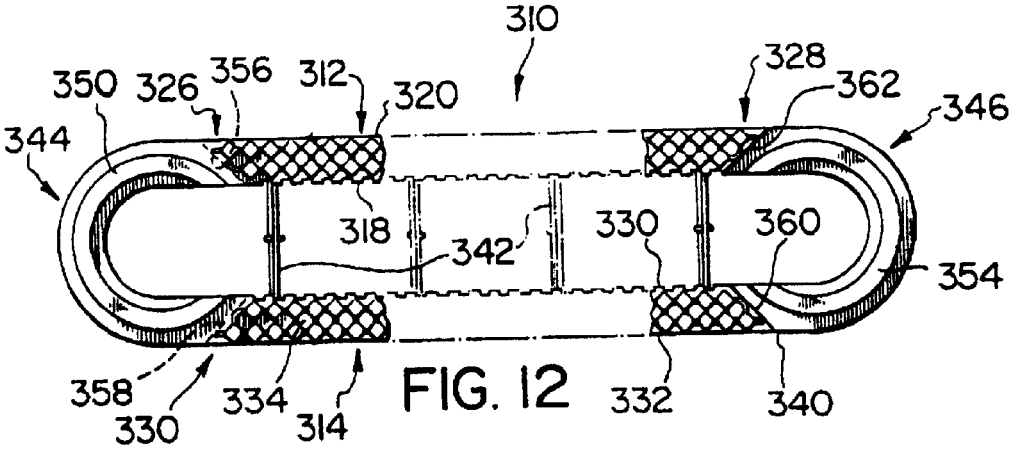
FIG. 12 is a top plan view of a component for use in the embodiment of FIG. 11.

When a change of direction of, say, 30° is required in a wall, the component 310 can be bisected at an appropriate point and turned end to end to form part components 310a and 310b (FIG. 11). The tongue 354 can then be mated with the groove 350 and the units rotated to the required angle. At that point a part of the end parts 344 and 346 will cross the space 356 between the panels. That part of the end parts 344 and 346 can then simply be cut out to allow the concrete core to be installed.

The ends 326 and 328 of panel 310, and 338 and 340 of panel 314 are angled as shown at 356, 358, 360 and 362 to accommodate the semi-circular end parts 344 and 346 over a range of rotation.

While a preferred configuration of this embodiment has been described, a number of variations are possible. For example, rather than being of semi-circular configuration, the end parts may be stepped to accommodate specific predetermined angles as in a semi-hexagonal configuration.

As well, only one of end parts 344 and 346 may be present on a given component with a second complementary and mating end part on a second component. There are, however, advantages in including the two end parts on a single component. These include the very significant fact that only a single mold is required for that case. As well, where the double-ended panels are utilized, builders will always be sure of having available an equal number of half joints.

The highly preferred overlapping configuration of blocks in a wall can be achieved with the double-ended unit by bisecting succeeding double-ended blocks at different locations along their length into non-equal parts.

In the typical basic component discussed earlier (e.g. FIG. 1), of 48-inch width, the bridging members 42 will preferably be spaced on 8-inch centres with the two bridging members closest to the ends of the component located 4 inches from the ends. Thus, when the panels are overlapped to form the wall, the bridging members of the various courses can be aligned to form continuous strips of end plates 44 and 46 over the entire height of the wall. This is a very significant advantage of the present system, since interior or exterior wall cladding can be fixed to the exterior of the end plates 44 and 46, preferably using screws.

Drainage is provided and parging and damp-proofing of the exterior as is the case with a conventional concrete basement wall.

Using the typical dimensions noted above with a panel separation of 6¼ inches (6¼ inches of concrete) the insulating value of the wall is R26. This is a very high rating for wall construction and thus no additional insulation is required. In addition to the energy-saving value of the insulation, the walls have high resistance to sound transmission with a typical sound reduction of 53 DBA.

The typical component noted above will weigh only about 2.8 kgs. and so provides a substantial advantage to tradesmen building a wall.

Thus it is apparent that there has been provided in accordance with the invention a building component that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention is:

1. A building component comprising:

first and second high density foam panels each having inner and outer surfaces, top and bottom, and first and second ends, said panels arranged in spaced parallel relationship with their inner surfaces facing each other, and at least two bridging members extending between and through and molded into said panel members, each said bridging member comprising:

a pair of elongated end plates oriented vertically and abutting against said outer surfaces of said panels;

a thin narrow strip member joining the mid-areas of said end plates;

a series of first narrow bracing members extending from positions adjacent a mid-point of said narrow strip member to positions spaced a short distance from the ends of said end plates; and a series of second narrow bracing members extending from positions on said first bracing members to positions on said strip member intermediate said plates and said mid-point of said strip member.

2. The component of claim 1 wherein said second bracing members are oriented substantially vertically.

3. The component of claim 2 wherein an edge of each said second bracing member closest to said mid-point of said narrow strip is substantially flush with said inner surface of a respective said panel.

4. The component of claim 3 including a series of short outer transverse stiffening members extending from said narrow strip vertically along said edges of said second bracing members and substantially flush with said inner surfaces of respective said panels.

5. The component of claim 4 wherein said stiffening members include a short 90 degree extension across respective said second bracing members into respective said panels.

6. The component of claim 1 including a central transverse stiffening member on each side of said mid-point of said narrow strip.

7. The component of claim 1 wherein said narrow strip includes a widened area about its mid-point with which said first bracing members are integral and which includes a predetermined pattern of seats whereby rebar may be selectively positioned relative to said component.

8. The component of claim 7 wherein said seats are defined in part by yieldable members whereby to provide snap fit for said rebar.

9. The component of claim 1 wherein lines through said series of first bracing members form an "X" pattern between said end plates.

10. The component of claim 1 including an elongated stiffening rib along an inner face of said end plates, said rib integral with ends of said first bracing members.

11. The component of claim 1 wherein said narrow strip has a stepped configuration in which an upper part of said strip is horizontally offset from a lower part thereof.

12. For use in a building component comprising first and second high density foam panels each having inner and outer surfaces, top and bottom, and first and second ends, said panels arranged in spaced parallel relationship with their inner surfaces facing each other, and at least two bridging members extending between and through and molded into said panel members; an improved bridging member comprising:

a pair of elongated end plates oriented vertically and abutting against said outer surfaces of said panels;

a thin narrow strip member joining the mid-areas of said end plates;

a series of first narrow bracing members extending from positions adjacent a mid-point of said narrow strip member to positions spaced a short distance from the ends of said end plates; and a series of second narrow bracing members extending from positions on said first bracing members to positions on said strip member intermediate said plates and said mid-point of said strip member.

13. A building component comprising:

first and second high density foam panels each having inner and outer surfaces, top and bottom, and first and second ends, said panels arranged in spaced parallel relationship with their inner surfaces facing each other, and at least two bridging members extending between and through and molded into said panel members, and wherein said top of one said panel is substantially thicker than the bottom thereof, said outer surface of said one panel is profiled to extend outwardly and upwardly from said bottom thereof to said top thereof, and wherein said inside surface of said thicker part is partially cut away in areas spaced from said bridging members.

14. The component of claim 13 wherein said outer surface of said one panel includes a lower vertical part, an upper vertical part, and an intermediate part connecting said lower and upper parts.

15. The component of claim 14 wherein said cut away parts follow the profile of but are spaced from said outer surface of said one panel.

16. A building component comprising:

first and second high density foam panels each having inner and outer surfaces, top and bottom, and first and second ends, said panels arranged in spaced parallel relationship with their inner surfaces facing each other, and at least two bridging members extending between and through and molded into said panel members, each said bridging member comprising:

a pair of elongated end plates oriented vertically and abutting against said outer surfaces of said panels;

a thin narrow strip member joining the mid-areas of said end plates;

a series of first narrow bracing members extending from positions adjacent a mid-point of said narrow strip member to positions spaced a short distance from the ends of said end plates;

a series of second narrow bracing members extending from positions on said first bracing members to positions on said strip member intermediate said plates and said mid-point of said strip member;

and wherein said top of one said panel is substantially thicker than the bottom thereof, said outer surface of said one panel is profiled to extend outwardly and upwardly from said bottom thereof to said top thereof, and wherein said inside surface of said thicker part is partially cut away in areas not containing said bridging members.

*17. A building component, comprising:*

*first and second insulating foam panels arranged to define therebetween a space for receiving pourable building material, and*

*at least two bridging members extending between and connecting said panels, each bridging member comprising:*

*a pair of end plates;*

*a thin narrow strip member joining the mid-areas of said end plates;*

*a series of first narrow bracing members extending from positions adjacent a mid-point of said narrow strip member to positions spaced a short distance from the ends of said end plates; and*

*a series of second narrow bracing members extending from positions on said first bracing members to positions on said strip member intermediate said plates and said mid-point of said strip member.*

*18. The building component of claim 17, wherein said end plates are elongated and are orientated substantially vertically.*

*19. The building component of claim 17, wherein said end plates extend substantially from a top end to a bottom end of said panels.*

*20. The building component of claim 17, wherein said pair of end plates abut against outer surfaces of said panels.*

*21. The building component of claim 17, wherein said bridging members are molded into said panels.*

*22. The building component of claim 17, wherein each of said bridging members further comprises first and second transverse stiffeners extending vertically along said bridging member and substantially flush with inner surfaces of said first and second panels.*

*23. A bridging member for connecting opposed foam panels of an insulated concrete form wall, said bridging member comprising:*

*a pair of end plates;*

*a thin narrow strip member joining the mid-areas of said end plates;*

*a series of first narrow bracing members extending from positions adjacent a mid-point of said narrow strip member to positions spaced a short distance from the ends of said end plates; and*

*a series of second narrow bracing members extending from positions on said first bracing members to positions on said strip member intermediate said plates and said mid-point of said strip member.*

*24. A building component, comprising:*

*first and second insulating foam panels arranged to define therebetween a space for receiving pourable building material, and*

*at least two bridging members extending between and connecting said panels, each bridging member comprising:*

*a pair of end plates;*

*a thin narrow strip member joining the mid-areas of said end plates;*

*a series of first narrow bracing members extending from positions adjacent a mid-point of said narrow strip member to positions spaced a short distance from the ends of said end plates;*

*a series of second narrow bracing members extending from positions on said first bracing members to positions on said strip member intermediate said end plates and said mid-point of said strip member; and*

*wherein said outer surface of said first panel is profiled to extend outwardly and upwardly from said bottom thereof to said top thereof to define a supporting shelf.*

*25. A building component, comprising:*

*first and second insulating foam panels arranged in spaced parallel relationship to define therebetween a space for receiving pourable building material, and*

*at least two bridging members extending between and connecting said panels, each bridging member comprising:*

*a pair of end plates;*

*a thin narrow strip member joining the mid-areas of said end plates;*

*a series of first narrow bracing members extending from positions adjacent a mid-point of said narrow strip member to positions spaced a short distance from the ends of said end plates; and*

*a series of second narrow bracing members extending from positions on said first bracing members to positions on said strip member intermediate said plates and said mid-point of said strip member.*

*26. A building component, comprising:*

*first and second insulating foam panels arranged in spaced parallel relationship to define therebetween a space for receiving pourable building material, and*

*at least two bridging members extending between and connecting said panels, each bridging member comprising:*

*a pair of end plates;*

*a thin narrow strip member joining the mid-areas of said end plates;*

*a series of first narrow bracing members extending from positions adjacent a mid-point of said narrow strip member to positions spaced a short distance from the ends of said end plates; and*

*a series of second narrow bracing members extending from positions on said first bracing members to positions on said strip member intermediate said plates and said mid-point of said strip member;*

*wherein said outer surface of said first panel comprises a portion extending at an angle relative to the vertical to define a supporting shelf.*

*27. The building component of claim 13, wherein said bridging members extend through both the inner and outer surfaces of said other one of said panels.*

*28. The building component of claim 27, wherein said bridging members include a pair of end plates, wherein one of said end plates of each bridging member abuts the outer surface of said other panel.*

*29. The building component of claim 13, wherein said one panel further includes at least two members extending inwardly from said inner surface of said one panel, each of said extending members having a top portion, a bottom portion and an intermediate portion extending therebetween, said top portion being substantially thicker than said bottom portion.*

*30. The building component of claim 29, wherein said extending members comprise partitions connected with said one panel.*

*31. The building component of claim 30, wherein said partitions are integrally formed from insulating foam material with said one panel.*

*32. The building component of claim 29, wherein each of said bridging members include a first end connected to one of said extending members of said one panel and a second end connected to said other panel.*

*33. The building component of claim 29, wherein said top portions of said extending members define at least a portion of a supporting shelf with said substantially thicker top of said one panel.*

*34. The building component of claim 33, wherein said supporting shelf includes a top surface of building material received within a space between said panels.*

*35. The building component of claim 34, wherein the building material received within said space defines a vertical wall portion integral with said supporting shelf.*

*36. The building component of claim 13, wherein said bridging members are formed integrally from one piece of material.*

* * * * *